United States Patent [19]
Powell

[11] Patent Number: 5,890,508
[45] Date of Patent: Apr. 6, 1999

[54] MAIN RELIEF VALVE FOR SAFETY RELIEF SYSTEM

[75] Inventor: Walter W. Powell, Sugar Land, Tex.

[73] Assignee: Flow-Safe, Inc., Orchard Park, N.Y.

[21] Appl. No.: 689,891

[22] Filed: Aug. 15, 1996

[51] Int. Cl.[6] ................................................ F16R 1/18
[52] U.S. Cl. .................... 137/15; 251/121; 137/489; 137/492; 137/271; 137/269
[58] Field of Search .................... 137/489, 492, 137/269, 271; 251/121, 120

[56] References Cited

U.S. PATENT DOCUMENTS

| | | | |
|---|---|---|---|
| 1,054,023 | 2/1913 | Niedecken | 137/269 |
| 1,223,326 | 4/1917 | Marsh | 137/271 |
| 3,389,717 | 6/1968 | Povalski | 251/121 |
| 4,172,466 | 10/1979 | Pattarini | 137/489 |
| 4,362,183 | 12/1982 | Richter | 137/489 |
| 4,425,938 | 1/1984 | Papa | 137/489 |
| 4,870,989 | 10/1989 | Bickford et al. | 137/489 |
| 4,967,998 | 11/1990 | Donahue | 251/121 |
| 4,991,620 | 2/1991 | Ligh | 137/489 |
| 5,007,614 | 4/1991 | Lockwood | 251/121 |
| 5,050,635 | 9/1991 | Tetsuka | 137/489 |
| 5,312,085 | 5/1994 | Yokoyama | 251/121 |
| 5,586,745 | 12/1996 | Knapp | 251/121 |

*Primary Examiner*—Denise L. Ferensic
*Assistant Examiner*—Ramyar Farid
*Attorney, Agent, or Firm*—Bush, Riddle & Jackson L.L.P.

[57] ABSTRACT

A pilot operated safety relief valve (14) has a main piston valve member (60) mounted for reciprocal movement between open and closed positions. The lower end of piston valve member (60) has a seat retainer (87) to retain an annular seat (89) therein. An interchangeable plug (93) is removably connected by bolt (97) to seat retainer (87) and piston valve member (60). Plug (93) extends within the inlet (50) to form a restriction within the inlet (50) defining an angular orifice (99) in the open position of the piston value member (60) for controlling discharge fluid flow. Different size plugs (93, 93A, 93B) as shown in FIG. 4 may be utilized in order to provide the desired orifice size for annular orifice 99 as illustrated in FIG. 4.

8 Claims, 3 Drawing Sheets

MAIN RELIEF VALVE FOR SAFETY RELIEF SYSTEM

BACKGROUND OF THE INVENTION

1. Field of the Invention

This invention relates to a main relief valve for a safety relief system, and more particularly to means to control the fluid discharge rate for the main relief valve in a safety relief system.

2. Description of Prior Art

Heretofore, safety relief systems for a pressure vessel, such as a tank, have utilized pilot operated relief valves. The main safety relief valve normally has a piston type valve member with a dome chamber over the valve member. A separate pilot valve continuously senses the tank pressure, and when the tank pressure increases to set pressure, the pilot valve is opened to vent the dome chamber and reduce the dome pressure thereby providing opening of the main valve member. When the tank pressure decreases, the pilot valve closes to repressurize the dome chamber from the tank pressure for closing of the main valve member.

Flow restrictors or restrictions for controlling fluid flow upon opening of a valve member have also been utilized heretofore with the selection of a predetermined flow restrictor positioned within and connected to the inlet for the valve member. The prior restrictors limit the maximum discharge rate through the flow passage but are not connected to and movable with the valve member. For example, U.S. Pat. No. 4,960,260 shows interchangeable flow restrictors removably connected to an inlet restriction for a control valve. However, the flow restrictor is not removably mounted on the valve member for movement with the valve member, and particularly on a piston type valve member for a relief valve.

The main safety relief valve is required by various regulations, including the ASME Boiler and Pressure Vessel Code, Unfired Pressure Vessels, Section VIII, to have a certain coefficient of discharge ($K_d$) for various sizes and pressure ranges of main relief valves. The requirements for obtaining a consistency in the coefficient of discharge ($K_d$) is set forth in the aforementioned ASME Code, Section VIII, paragraph VG 131.

It is desirable that a single main relief valve, particularly the valve body, be provided for a plurality of various pilot valves so that it is only necessary to stock one main relief valve thereby reducing the overall inventory of valves. Further, it is desirable that various interchangeable piston type valve members be provided for the common main relief valve with the valve members providing a consistency in the coefficient of discharge ($K_d$). A supply of separate piston type valve members having interchangeable flow restrictors thereon of different sizes and different orifice restrictions is desirable in order to obtain the flow control desired for the main relief valve, thereby minimizing the inventory of valve parts and reducing customer stocked valve parts to result in improved service to customers.

IDENTIFICATION OF OBJECTS

It is an object of this invention to provide a main relief valve for a pilot operated safety relief system which may be utilized with various pilot relief valves.

It is a further object of this invention to provide such a main relief valve which is adapted to be utilized with a variety of interchangeable piston-type valve members which have a consistency in the coefficient of discharge ($K_d$) for meeting regulatory requirements.

SUMMARY OF THE INVENTION

The present invention is directed particularly to a pilot operated main relief valve for a safety relief system which includes a piston-type valve member having an end plug thereon which is received within the inlet from the pressure vessel to form a flow restriction in such inlet. The plug defines an annular orifice between the outer periphery of the plug and the opposed inner peripheral surface of the inlet conduit from the pressure vessel. The restriction in the inlet formed by the plug coacts with the main valve chamber upon opening of the piston-type valve member to define a consistency in the coefficient of discharge ($K_d$) in accordance with ASME code requirements.

Various flow control characteristics of the main relief valve may be desired for various types of operations in which a pilot operated relief valve is utilized. To provide a single main relief valve for a range of desired flow control characteristics or features, the piston assembly may be utilized with a plurality of interchangeable removable plugs fitting within the inlet to define flow restrictions of different orifice sizes thereby to provide a desired flow control or discharge rate while utilizing only a single piston-type valve member with the interchangeable plugs. The plugs may be easily removed from the valve member and other plugs substituted to provide the desired restriction for a consistency in fluid discharge from the main relief valve. Further, it may be desirable to utilize different sealing and seating arrangements for the main valve member. In some instances an elastomeric annular seal may be provided while in other instances a substantially rigid plastic annular seal and seat may be desired. For this purpose, it is only necessary to replace the piston assembly on the piston valve member.

From the foregoing, it is apparent that a highly versatile safety relief valve has been provided in which a common main relief valve is provided with a minimal change in internals or removable valve parts for adapting the safety relief valve for different flow control characteristics as may be predetermined or desired. The utilization of a variety of interchangeable plugs of various sizes to provide a range of annular discharge orifices permits the utilization of such a safety relief valve.

The safety relief valve of this invention may also be utilized with various pilot valves which are mounted directly on the body of the main valve without any separate tubing between the pilot valve and main valve for dome ports and exhaust ports. Matching planar faces on the pilot valve body and main valve body are secured to each other with aligned dome ports and exhaust ports.

Other objects, features, and advantages of the invention will be apparent from the following drawings and specification.

DESCRIPTION OF THE INVENTION

Figure 1:
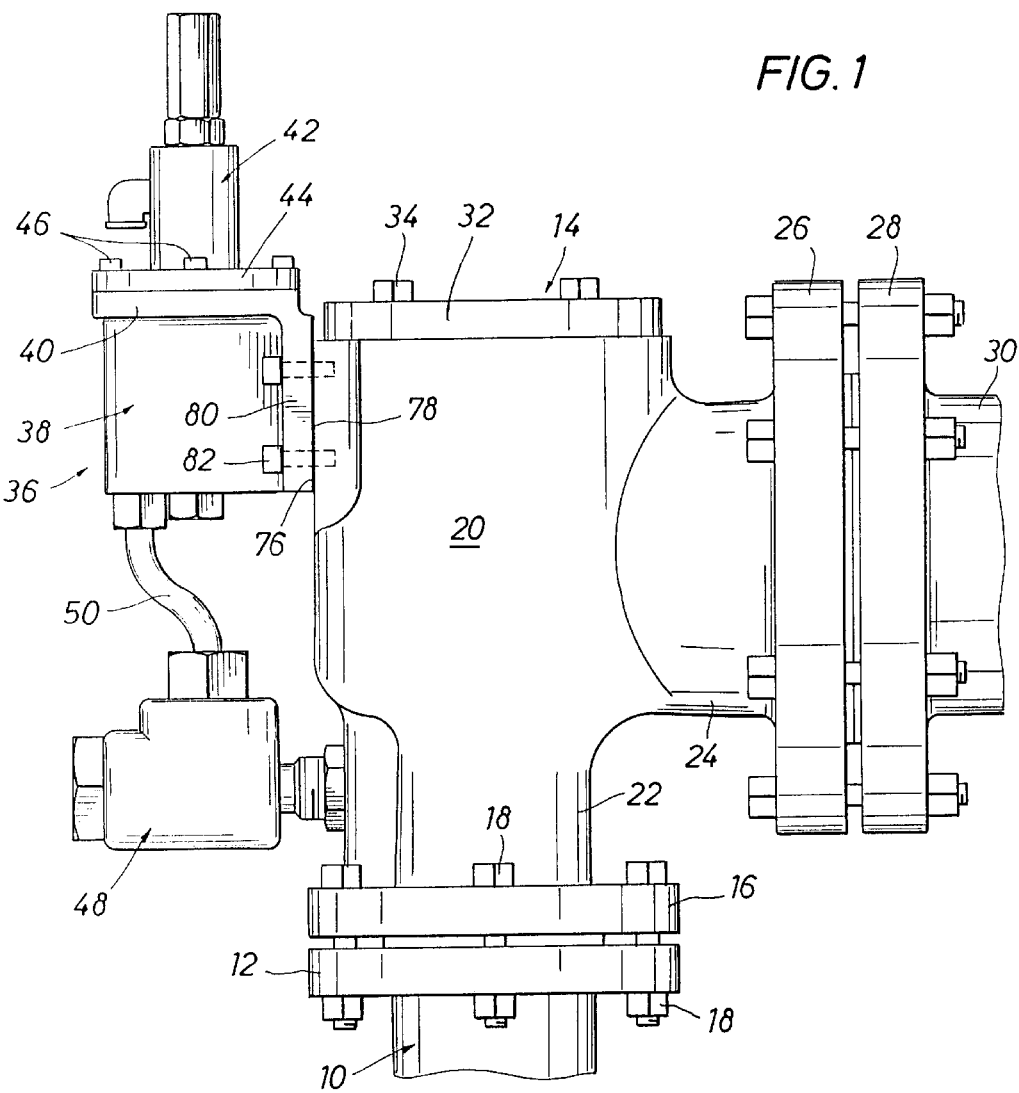
FIG. 1 is a side elevational view of a safety relief valve assembly including the present invention and including a main safety relief valve and associated pilot valve connected thereto in a safety relief system for a pressure vessel.
Figure 2:
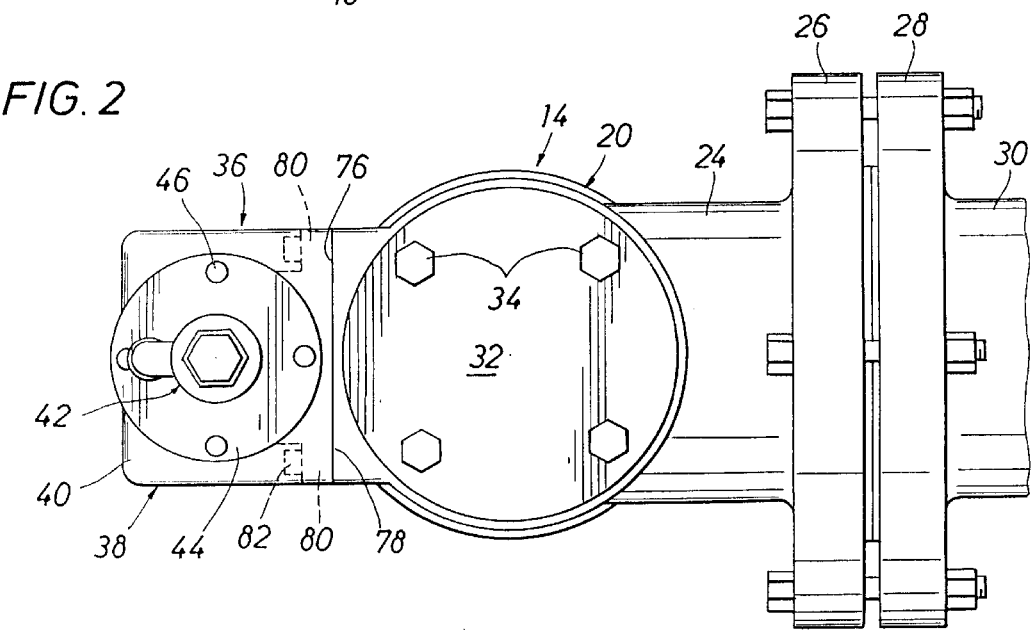
FIG. 2 is a top plan view of the main relief valve and associated pilot valve shown in FIG. 1.
Figures 3, 4, 6:
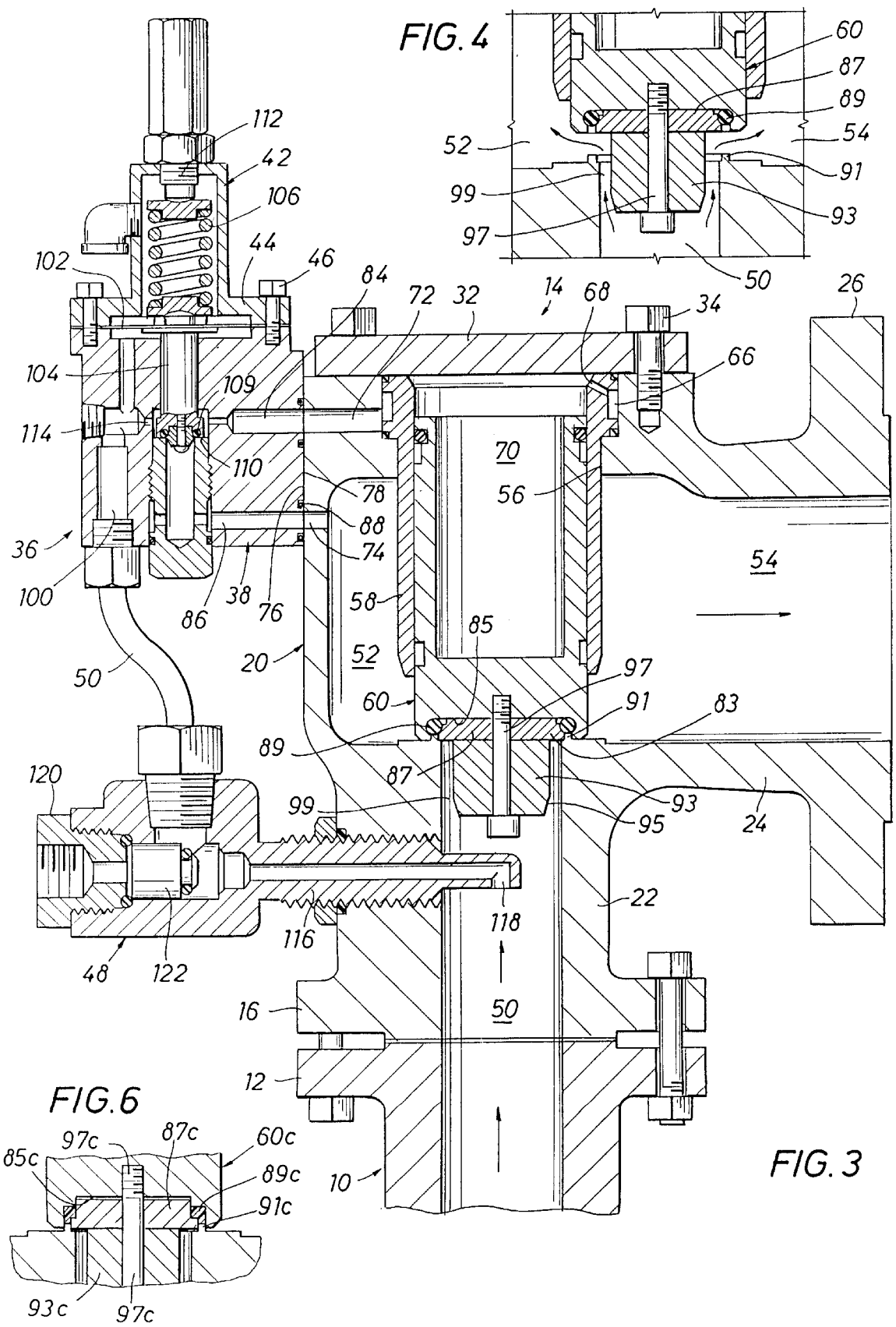
FIG. 3 is an enlarged sectional view of the main safety relief valve and associated pilot valve shown in FIGS. 1 and 2, and illustrating the main relief valve in normal operating condition with the main relief valve member in a closed position blocking flow from the pressure vessel.
FIG. 4 is an enlarged fragment of the piston valve member of FIG. 3 shown in an open position.
FIG. 6 is a section of a modified seat on the main valve member for engaging the fixed seat about the inlet passage.

Referring now to the drawings for a better understanding of this invention, and more particularly to FIGS. 1–3, a pilot operated safety relief valve assembly is illustrated in a safety relief system, including a pressure vessel or tank or line having an inlet generally indicated at 10 with a flange 12 thereon. A main relief valve is shown generally at 14 having a lower flange 16 connected to upper flange 12 of the pressure vessel by suitable nut and bolt combinations shown at 18. Relief valve 14 has a main body 20 including an inlet 22 and an outlet 24. Outlet 24 has a flange 26 connected to flange 28 of an outlet line 30. An upper cover plate 32 is secured to body 20 by suitable bolts 34.

A pilot valve is shown generally at 36 including a body generally indicated at 38 having an upper flange 40. A bonnet 42 has a lower flange 44 secured to flange 40 by suitable bolts 46. An inlet pressure fitting is indicated generally at 48 and has an inlet tubing line 50 extending therefrom to pilot valve 36.

Referring now particularly to FIG. 3, main relief valve 14 has an inlet flow passage 50 leading to a main body chamber 52. An outlet passage 54 extends from main body chamber 52. Body 20 has an upper access opening or bore 56 adjacent cover plate 32. A generally cylindrical sleeve or liner 58 is received within opening 54 and extends downwardly in main valve chamber 52. A piston valve member 60 is received within liner 58 and will be described further hereinafter. Sleeve 58 has an upper outer annular groove at 66. A connecting port 68 provides fluid communication with a dome chamber 70 defined by sleeve 58 and piston valve member 60. A dome port 72 in fluid communication with annular groove 66 extends through the wall of main valve body 20. An exhaust or vent port 74 extends through the wall of body 20 to main valve chamber 52 to permit the exhaust of fluid through outlet passage 54 and outlet line 30 (see FIG. 1).

Main valve body 20 has an outer planar mounting face 76 through which dome port 72 and exhaust port 74 extend. Body 38 of pilot valve 36 has an outer planar mounting face 78 in opposed relation to face 76. Side mounting flanges 80 adjacent mounting face 78, as shown particularly in FIGS. 1 and 2, receive bolts 82 to secure opposed mounting faces 76 and 78 to each other in contacting relation. Pilot valve body 38 has a dome port 84 and an exhaust port 86 in axial alignment with respective dome port 72 and exhaust port 74 in main valve body 20. Elastomeric O-rings 88 fit between faces 76 and 78 about the aligned dome ports or passages 72, 84 and the aligned exhaust ports or passages 74, 86.

Pilot valve 36 has a fluid inlet passage 100 extending to a fluid inlet sensing diaphragm 102 which is secured to a spindle valve member 104. A spring 106 forces valve member 104 into a seated position on seat 110 by engagement of seal 109 against seat 110. The compression of spring 106 may be adjusted by a suitable adjusting screw 112. An orifice 114 from inlet passage 100 is in fluid communication with dome chamber 70 through dome ports 72 and 84. Thus, inlet fluid pressure from inlet passage 100 pressurizes dome chamber 70 in the closed position of main valve member 60. Inlet pressure from vessel 10 faces an upper effective area below main valve member 60 which is less than the inlet pressure facing a lower effective area of main valve member 60. Accordingly, main valve member 60 remains closed as long as inlet pressure is communicated to dome chamber 70.

As shown in FIG. 3, an inlet pressure fitting 48 has an externally threaded inlet pressure pickup tube 116 threaded within an internally threaded side port in the wall of inlet 22. Inlet tube 116 extends into inlet passage 50 and has an end sensing port 118 directed toward the pressure vessel to sense the inlet fluid pressure from outlet 10 of the pressure vessel. A field test fluid connection indicated at 120 is combined with inlet pressure fitting 48. A shuttle check valve member 122 is mounted within fitting 48 for movement between one position blocking fluid communication from inlet tube 116 and another position blocking fluid communication from test fitting 120. Test fluid from a separate fluid source (not shown) is removably threaded within fitting 120 to provide test fluid to inlet passage 100 and sensing diaphragm 102 to test pilot valve 36 for actuation at the set pressure. In the event fluid pressure from inlet passage 50 increases beyond the set pressure of pilot valve 36 during testing of pilot valve 36, shuttle valve member 122 is moved by the inlet fluid pressure to a position blocking the test fluid as shown in FIG. 3 and permitting opening of the main relief piston valve member 60.

Figure 5:
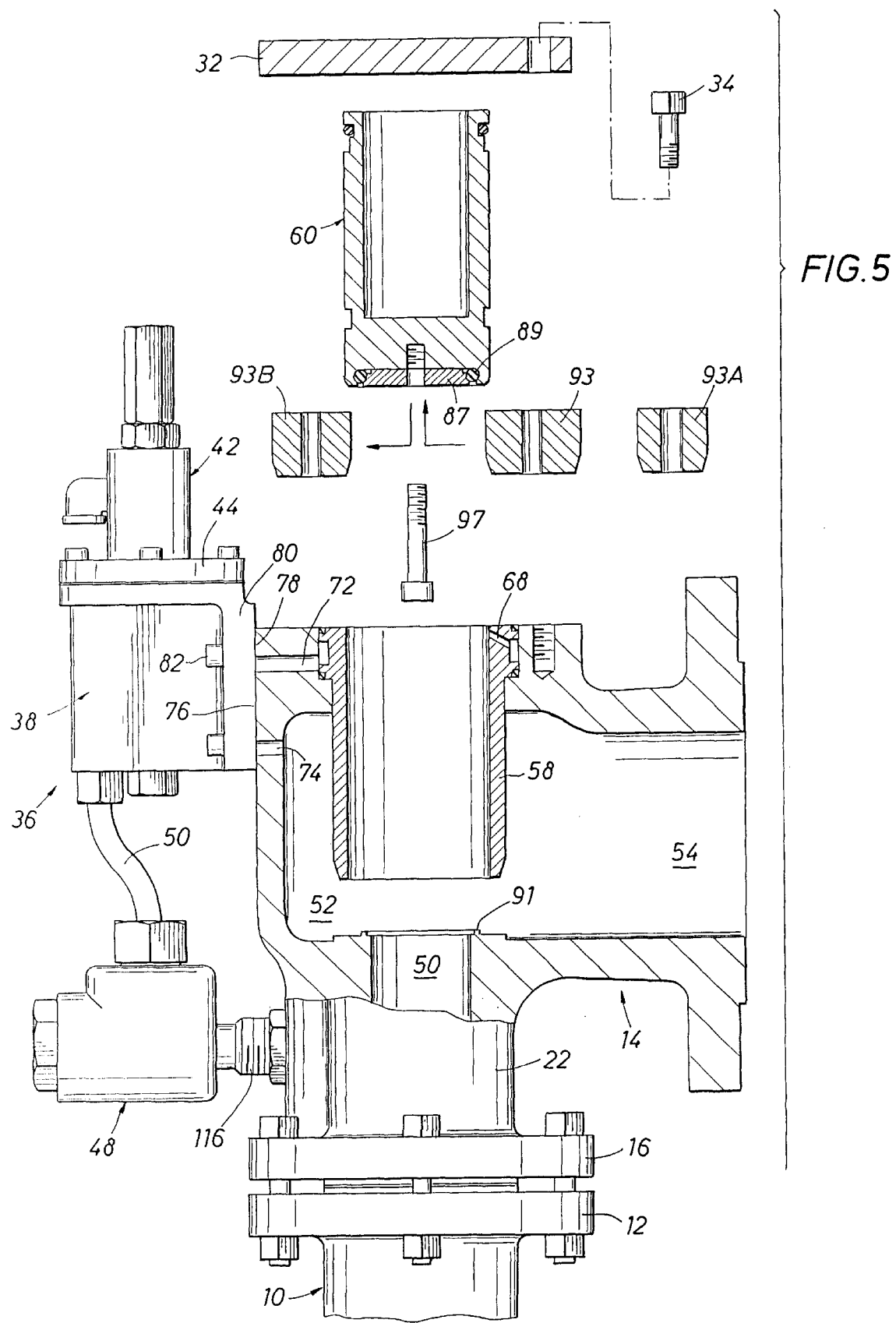
FIG. 5 is an enlarged sectional view similar to FIG. 3 but showing the piston valve member in exploded relation removed from the main valve body with a plurality of interchangeable plugs of various sizes illustrated.

Piston valve member 60 forms an important part of this invention and has a lower pocket or recess 85 therein. A lower disc shaped seal retainer 87 is mounted within recess 85 and secures an elastomeric O-ring 89 for sealing against a fixed annular metal seat 91 positioned about inlet passage 50. An outer annular lip or flange 83 on retainer 87 engages O-ring 89 to hold O-ring 89 within recess 85. Fixed seat 91 is received within an annular groove between lip 83 and the body of piston valve member 60. A generally cylindrical plug 93 having a tapered lower end 95 is secured against seal retainer 87 by removable bolt 97. The outer periphery of plug 93 is spaced from the inner periphery of inlet passage 50 to determine the size of an annular area of orifice 99. Thus, to increase the size of orifice 99 and the fluid discharge rate upon opening of valve member 60 as shown in FIG. 4, the diameter of plug 93 is decreased. As shown in FIG. 4, piston 60 may be easily removed from valve body 20 upon removal of cover 32. Plug 93 is easily removed by unthreading of locking bolt 97 and may be replaced with another plug. As shown in FIG. 3, the length of plug 93 is greater than the travel distance of piston 60 between open and closed positions so that orifice 99 maintains a substantially constant size throughout the movement of piston 60 between open and closed positions. Plugs 93A and 93B of smaller diameters than plug 93 are illustrated in FIG. 5 and may be substituted for plug 93 to increase the discharge flow rate. Taper 95 minimizes fluid turbulence upon opening of piston valve member 60 and subsequent fluid discharge.

Regulations (ASME Section VIII criteria) require a consistency for the coefficient of discharge ($K_d$) for a specific design and for each size of a safety relief valve. Nine valves are tested, three each of three sizes at three set pressures. All measured coefficients should fall within±5 percent of the numeric average. The present invention utilizing interchangeable plugs of different diameters mounted on the piston valve member meet ASME regulations over a range of sizes and amount of restriction by the plugs and have been assigned coefficient, K=0.9 Kd. As a result, the inventory to service a customer base is minimized, and the customer stocked parts are reduced. If discharge flows are required at intermediate annular restrictions by the plug, no additional flow testing is required.

To establish the coefficient of discharge ($K_d$) for a specific design and for a particular valve size, the following procedures are utilized.

Specific Design—Coefficient of Discharge ($K_d$)

For a specific design with geometrically similar flow paths, a coefficient of discharge is established for the line of venting devices by using the following procedure.

Three devices for each of three different sizes (a total of nine devices) are tested, each at a different pressure. At least one of the test pressures is the minimum design pressure or vacuum for the design, and one of the test pressures is the maximum pressure or vacuum that the test facility can support. The other test pressures are evenly distributed between the minimum and maximum test pressures. All of the test pressures are those where lift of the seat disk is sufficient for the nozzle to control the flow.

The coefficient of discharge for each test shall is determined by:

$$K_d = \frac{\text{Actual Flow}}{\text{Theoretical Flow}}$$

Where:

$K_d$=coefficient of discharge of the device. Theoretical flow is determined by:

$$SCFH = 278,700 P_1 A \sqrt{\frac{k}{MTZ(k-1)} \left[ \left(\frac{P_2}{P_1}\right)^{2/K} - \left(\frac{P_2}{P_1}\right)^{k+\frac{1}{k}} \right]}$$

| | | |
|---|---|---|
| SCFH | = | theoretical flow rate, in standard cubic feet per hour of air. |
| A | = | minimum flow area of device, in square inches. |
| $P_1$ | = | pressure at device inlet, in pounds per square inch absolute. |
| $P_2$ | = | pressure at device outlet, in pounds per square inch absolute. |
| k | = | ratio of specific heats. |
| T | = | absolute temperature at device inlet (°F + 460). |
| M | = | molecular weight of gas. |
| Z | = | compressibility factor to account for deviation of actual gas from a perfect gas. |

The nine experimentally determined coefficients of discharge of the devices tested are averaged. Measured coefficients must fall within±5 percent of the average. The flow capacity for any pressure within the design pressure range is calculated by multiplying the theoretical flow for that pressure by 0.9.

Operation

Upon an increase in fluid pressure in outlet 10 of the pressure vessel or line beyond the set pressure of pilot valve 36, the fluid pressure is sensed by sensing port 118 and communicated through inlet tubing 50 and inlet passage 100 to sensing diaphragm 102. Upward movement of diaphragm 102 lifts valve member 104 to provide fluid communication between aligned dome ports 72, 84 and exhaust ports 74, 86 to vent dome chamber 70. A decrease in fluid pressure in dome chamber 70 in combination with an increase in fluid pressure in inlet passage 50 effects opening of main piston valve member 60 to open and provide fluid communication between inlet passage 50 and outlet passage 54 for relief of the fluid pressure in outlet 10 and the associated pressure vessel. Annular discharge orifice 99 as shown in FIG. 4 provides a restricted discharge opening for the relief of fluid pressure from the pressure vessel. The size of orifice 99 is determined by the diameter of plug 93 and bore of passage 50 for the specific required flow. Upon a reduction of fluid pressure in fluid passage 50 below the set fluid pressure, valve member 104 reseats to block the venting of dome chamber 70 through exhaust ports 86 and 74. Fluid inlet pressure from inlet passage 100 through orifice 114 and dome ports 84, 72 repressurizes dome chamber 70 to increase the fluid pressure in dome chamber 70 thereby effecting closing of main piston valve member 60 and seating of O-ring 89 on fixed seat 91.

From the above, it is apparent that interchangeable plugs 93, 93A, and 93B extending within the inlet passage 50 of main safety relief valve 14 provide a flow restriction of a predetermined size. Plugs of varying diameters are utilized to provide an annulus orifice 99 of a predetermined size to obtain a desired flow with a consistency within established regulations.

Referring to FIG. 6, a modified seat arrangement for piston valve member 60C is illustrated in which seal retainer 87C secures a plastic seal 89C formed of a material such as "Teflon"™, for example, on the end of piston valve member 60C. Seal 89C seats on seat 91C in the closed position of piston valve member 60C as shown. A generally cylindrical plug 93C is secured by externally threaded bolt 97C on piston valve member 60C. Valve member 60C is modified to receive a spring energized plastic seal rather than "O" ring seal 150 of FIG. 3. The top of the piston is chamfered so that the plastic seal may be slid into its groove.

While preferred embodiments of the present invention have been illustrated in detail, modifications and adaptations of the preferred embodiments may occur to those skilled in the art.

However, it is to be expressly understood that such modifications and adaptations are in the spirit and scope of the present invention as set forth in the following claims.

What is claimed is:

1. A safety relief valve system for assembly of a safety relief valve of a predetermined fluid discharge rate comprising:

a single set of valve components including, a body (20) having a main valve chamber (52), and an inlet (50)

and an outlet (54), a fixed annular valve seat (91) extending about said inlet (50) adjacent said valve chamber, and characterized by a valve seat inner cylindrical diameter, a piston valve member (60) mounted within said main valve chamber (52) for axial movement over a predetermined maximum distance between fully open and fully closed positions relative to said valve seat (91) to control fluid flow from said inlet (50) to said valve chamber (52), said piston valve member (60) having an inlet end which faces said inlet (50);

a stop within said body to prevent movement of said piston valve member beyond said maximum distance;

said piston valve member having an annular seal (89) carried at its inlet end for sealing against said fixed annular valve seat (91) in the closed position of said valve member;

a plurality of interchangeable plugs (93, 93A, 93B) each of which is arranged and designed to be removably secured to said inlet end of said piston valve member (60) and to extend into said inlet (50) when said piston valve member (60) is in said open and said closed positions, each of said plurality of plugs being cylindrical in shape and of a different outer diameter one from each another, where each one of said plurality of plugs is characterized by a length greater than the travel of said piston valve member between fully open and fully closed positions so that when removably secured to said inlet end of said piston valve member (60), a substantially constant annular orifice (99) is defined by the difference between said outer diameter of one plug and said inner cylindrical diameter of said fixed annular valve seat (91), said substantially constant annular orifice being maintained throughout said entire axial movement of said piston valve member over said predetermined distance between fully open and fully closed positions with said plug remaining partially within said Inlet during the entire movement of said piston valve member, and a separate fastener (97) for removably securing said one of said plurality of plugs (93, 93A, 93B) to said inlet end of said piston valve member (60);

said assembly system including the steps of:
  selecting one of said plurality of Interchangeable plugs for mounting on said piston valve member: and
  mounting said selected one of said plurality of interchangeable plugs on said piston valve member with said fastener;
  whereby a predetermined constant fluid discharge rate of said safety relief valve is achieved by assembly of said selected one of said plurality of plugs to said inlet end of said piston valve member, where said selected one of said plurality of plugs has an outer diameter difference from said inner diameter of said valve seat which has been arranged and designed to produce said predetermined constant fluid discharge rate.

2. The safety relief valve system of claim 1 wherein:
each of said plugs is of substantially the same length.

3. The safety relief valve system of claim 1 wherein:
said separate fastener comprises a removable bolt extending through said plug for securing said plug to said piston valve member.

4. The safety relief valve system of claim 1 wherein:
said piston valve member (60) includes a recess (85) at its inlet end and said annular seal (89) is disposed within said recess; and
a disc-shaped seal retainer is removably secured within said recess to engage and secure said seal (89) within said recess (85).

5. The safety relief valve system of claim 4 wherein:
said annular seal is an elastomeric O-ring.

6. The safety relief valve system of claim 4 wherein:
said annular seal is formed of rigid plastic.

7. The safety relief valve system of claim 1 wherein:
said body (20) has an outer planar surface with valve body exhaust and dome ports therein;
a pilot valve is mounted on said valve body; and
said pilot valve has a mating planar surface with pilot valve exhaust and dome ports which are in axial alignment with said valve body exhaust and dome ports.

8. A method for assembly of a safety relief valve of a predetermined fluid discharge rate comprising:
providing a single set of valve components including:
  providing a body (20) having a main valve chamber (52), and an inlet (50) and an outlet (54);
  providing a fixed annular valve seat (91) extending about said inlet (50) adjacent said valve chamber, and characterized by a valve seat inner cylindrical diameter;
  providing a piston valve member (60) mounted within said main valve chamber (52) for axial movement over a predetermined maximum distance between fully open and fully closed positions relative to said valve seat (91) to control fluid flow from said inlet (50) to said valve chamber (52), said piston valve member (60) having an inlet end which faces said inlet (50);
  providing a stop within said body to prevent movement of said piston valve member beyond said maximum distance;
  said piston valve member having an annular seal (89) carried at its inlet end for sealing against said fixed annular valve seat (91) in the closed position of said valve member;
  providing a plurality of interchangeable plugs (93, 93A, 93B) each of which is arranged and designed to be removable secured to said inlet end of said piston valve member (60) and to extend into said inlet (50) when said piston valve member (60) is in said open and said closed positions;
  each of said plurality of plugs being cylindrical in shape and of a different outer diameter one from each another, where each one of said plurality of plugs is characterized by a length greater than the travel of said piston valve member between fully open and fully closed positions so that when removably secured to said inlet end of said piston valve member (60), a substantially constant annular orifice (99) is defined by the difference between said outer diameter of one plug and said inner cylindrical diameter of said fixed annular valve seat (91), said substantially constant annular orifice being maintained throughout said entire axial movement of said piston valve member over said predetermined distance between fully open and fully closed positions with said plug remaining at least partially within said inlet during the entire movement of said piston valve member;
selecting one of said plurality of interchangeable plugs for mounting on said piston valve member;
providing a separate fastener (97) extending through said plug for removably securing said one of said plurality of plugs (93, 93A, 93B) to said inlet end of said piston valve member (60); and
mounting said one of said plurality of plugs on said piston valve member (60) with said fastener;
whereby a predetermined constant fluid discharge rate of said safety relief valve is achieved by assembly of said single set of valve components with a selected one of said plurality of plugs to said inlet end of said piston valve, where said selected one of said plurality of plugs has an outer diameter difference from said inner diameter of said valve seat which has been arranged and designed to produce said predetermined constant fluid discharge rate.

* * * * *